INVENTOR.
Robert S. Strimel
BY Frederick J. Olsson
ATTORNEY.

Oct. 5, 1971  R. S. STRIMEL  3,610,030
MEASURING SYSTEM FOR BRINELL HARDNESS TESTERS
Filed July 14, 1969  2 Sheets-Sheet 2

INVENTOR.
Robert S. Strimel
BY
Frederick J. Olsson
ATTORNEY.

United States Patent Office 3,610,030
Patented Oct. 5, 1971

3,610,030
MEASURING SYSTEM FOR BRINELL
HARDNESS TESTERS
Robert S. Strimel, Penllyn, Pa., assignor to Tinius Olsen
Testing Machine Company, Willow Grove, Pa.
Filed July 14, 1969, Ser. No. 841,268
Int. Cl. G01n 3/32
U.S. Cl. 73—83                                    3 Claims

ABSTRACT OF THE DISCLOSURE

Brinell depth sensing equipment comprising a lever connected to follow the motion of the Brinell indenter and a lever connected to drive indicating means together with mechanism operable after the indenter has made contact with the specimen surface for establishing a point of reference for depth measurement to interconnect the levers so that the amount of indentation is reflected by the indicator means.

---

This invention relates to Brinell hardness testing equipment and in particular relates to improved mechanism for sensing the depth of the Brinell indentation and provide a visual reading thereof and/or a control signal corresponding thereto.

One of the objects of the invention is to provide improved Brinell depth measuring equipment characterized by structure to establish, particularly for production testing of large numbers of specimens, uniform points of reference for depth measuring whereby to enhance accuracy and consistency in test results.

Another object of the invention is to provide improved Brinell depth measuring equipment characterized by structure which can be operated in conjunction with the specimen loading system so that machine frame deflection is not present in a depth reading whereby the true depth of indentation is sensed and indicated.

Another object of the invention is to provide improved Brinell depth measuring equipment characterized by structure which, through the medium of an initial load and a dwell in the initial load condition provides a positive, accurate starting point for the indenter to begin its penetration and thereby eliminate special preparation of the specimen surface.

Another object of the invention is to provide improved Brinell depth measuring equipment characterized by structure which is interconnected to the specimen and indenter in a manner so as not to be subject to shocks or stresses due to the indenter engaging the specimen and thereby eliminate wear and damage and improve longevity.

Another object of the invention is to provide improved Brinell depth measuring equipment characterized by structure adaptable either for moving the motion pin of a dial indicator to provide a visual indication of the amount of indentation or activate a motion transducer so as to develop an electrical signal as a function of the amount of indentation.

Another object of the invention is to provide improved Brinell depth measuring equipment characterized by structure which permits fluid pressure operated Brinell hardness testers now in the field to be rapidly modified to incorporate the invention.

Other objects of the invention and various advantages thereof will be readily apparent to those skilled in the art by reference to the following specification considered in conjunction with the accompanying drawings forming a part thereof and it is to be understood that modifications may be made in the structural details there shown and described, within the scope of the appended claims, without departing from the scope and spirit of the invention.

Figure 1:
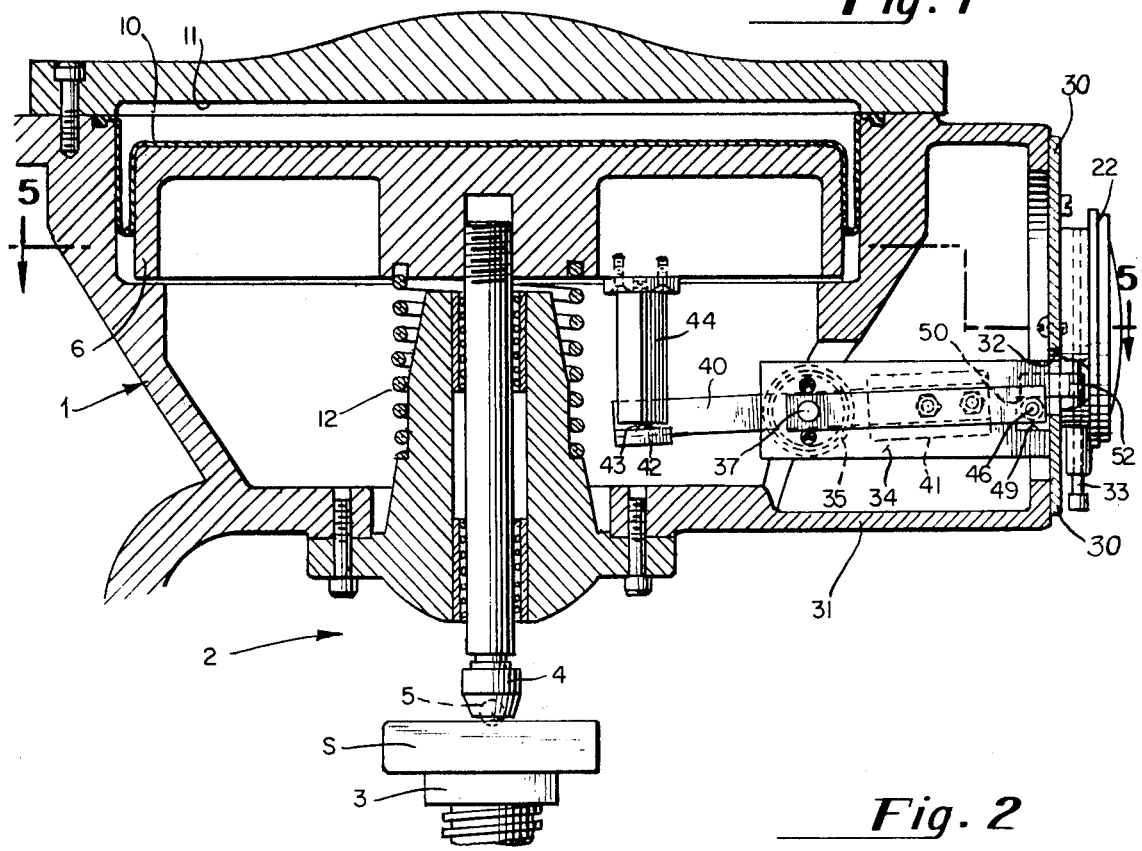
FIG. 1 is a sectional elevational view of the head of a typical fluid pressure operated, Brinell hardness testing machine incorporating the invention.

In FIG. 1 the head 1 of a Brinell hardness testing machine is mounted on the frame 2. The work-table or platen is indicated at 3 and is adjustable in a vertical direction. The platen supports a test specimen S. The head mounts the indenter 4 including the Brinell ball 5. The indenter is mounted in suitable bearings for back and forth motion. The piston 6 is connected to the top end of the indenter. On top of the piston is a diaphragm 10 which in conjunction with the head forms a chamber 11. Air in the chamber 11 causes the piston and indenter to move downwardly toward the work-table or specimen. The spring 12 biases the piston in an upward direction so that when the air pressure in chamber 11 is removed, the piston is moved to a position toward the top of the head.

The invention contemplates that for testing purposes there is established a definite point of reference from which the depth of indentation is measured or sensed. The purpose and advantage of the same being to ensure accuracy. This feature is especially important in high production testing of identical specimens. The foregoing is accomplished as follows.

Air or fluid pressure is supplied to the chamber 11 in an amount sufficient for the indenter to move downwardly and cause the Brinell ball 5 to firmly engage the surface of the specimen S. For descriptive purposes this can be called the initial load. The initial load is constant for each specimen tested and preferably is about 10% of the full Brinell load. With the same initial load it is contemplated that the indenter will be positioned in the same way on the surface of each specimen at the start point of the indentation.

After the initial load is applied, and the starting point determined, the invention contemplates that the full Brinell load be applied. Sufficient air is introduced into the chamber 11 so that the Brinell ball 5 penetrates the specimen in accordance with the load and hardness.

According to the invention, the initial load is held on momentarily before the Brinell load is applied. This lets the Brinell ball become properly engaged with the surface and enhances the objective of substantially identical starting points on each specimen.

Figure 4:
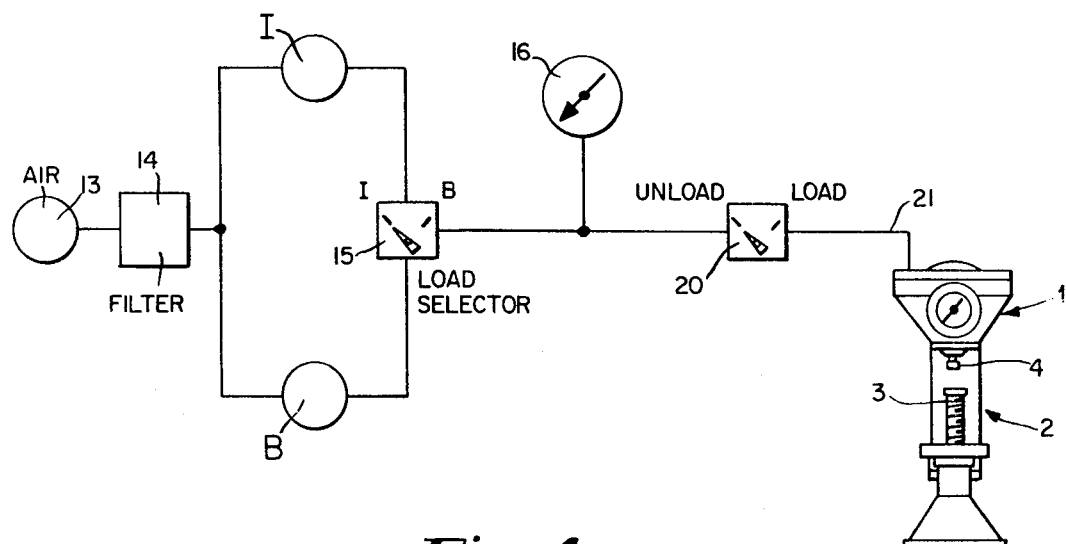
FIG. 4 is a diagrammatic view of hydraulic circuits of the invention.

The manner in which the air is supplied to the chamber 11 for the initial and full load conditions is illustrated in FIG. 4. Air from the source 13 is sent to a filter 14 and thence to an initial load regulator I and also to a Brinell regulator B. The regulators are connected to a load selector valve 15 which can be turned either to the I or B positions. An air guage 16 is connected to the load selector and is calibrated to indicate kilograms of load. The load selector valve 15 is also connected to an unload—load valve 20 which in turn is connected to the chamber 11 by the line 21. The valve 20 can be adjusted to the unload position and in that condition the chamber 11 is connected to exhaust. Alternatively, the valve 20 can be moved to a load position in which the air from the load selector is transferred to the chamber 11.

Figure 2:
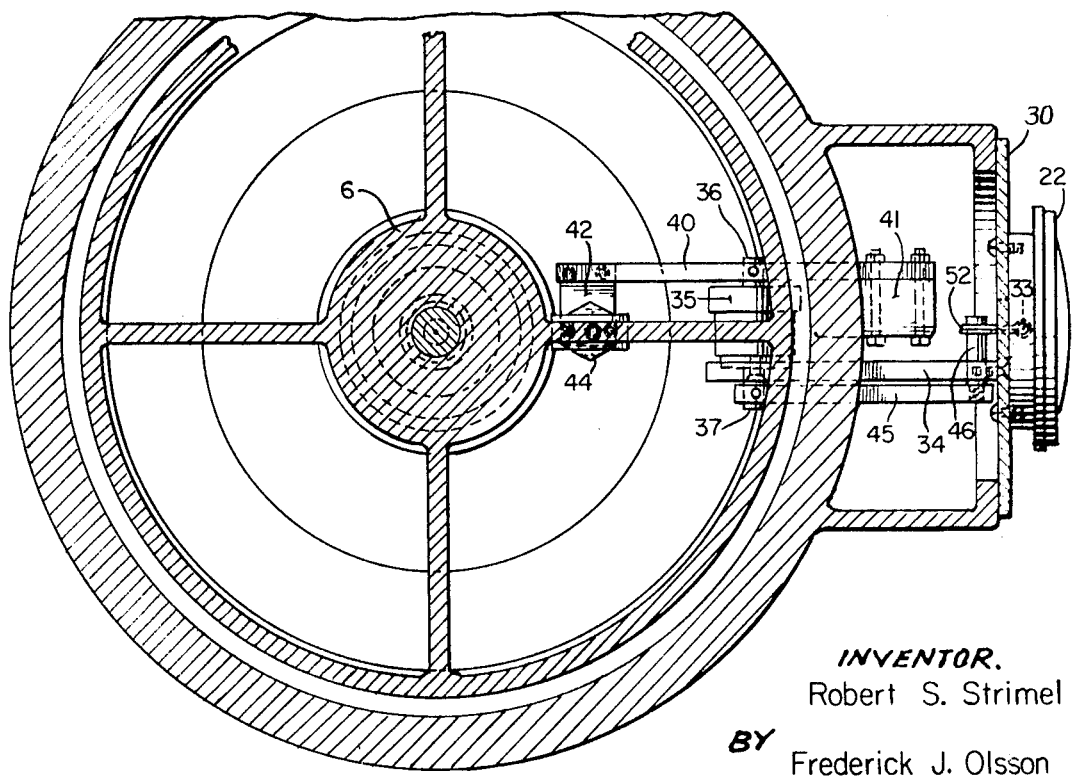
FIG. 2 is a view taken along the lines 2—2 of FIG. 1.
Figure 3:
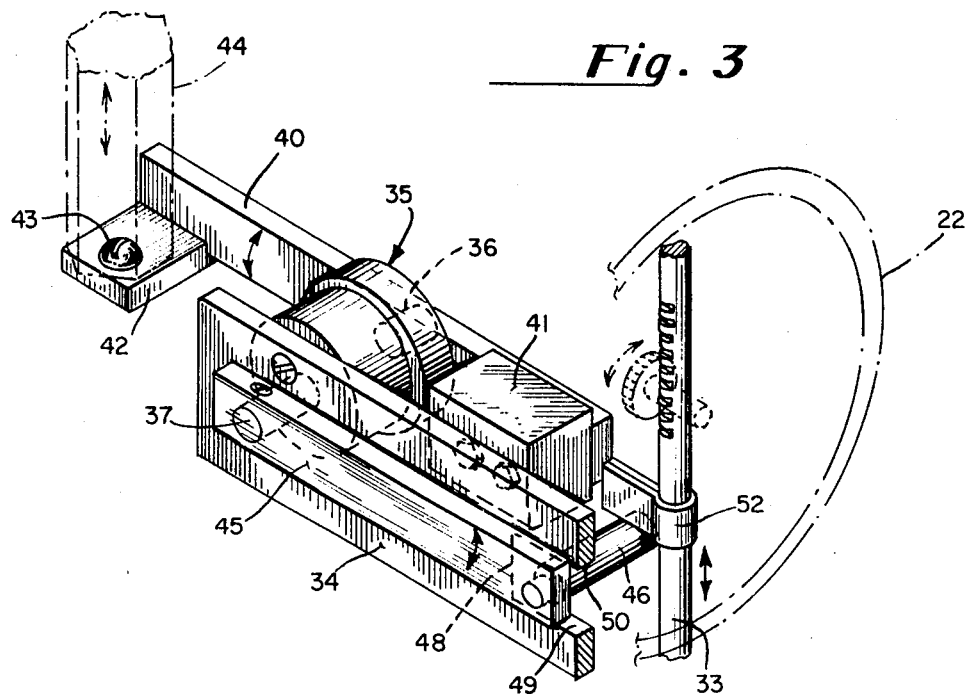
FIG. 3 is an exploded perspective view showing the positional relation of the various components of the invention.

In FIGS. 1, 2 and 3 I have shown a preferred arrangement for driving a dial indicator 22 to give a visual indication of the depth of penetration of the ball 5.

Referring to FIG. 1 a main plate 30 is mounted on the tubular extension 31. The plate is apertured as indicated at 32 and the dial indicator 22 extends across the aperture. Conventionally, the back of the dial indicator is removed so that interior, particularly the motion rod 33, is readily accessible as shown in FIG. 3.

A clutch bracket 34 is connected to and extends generally normal to the plate 30 into the tubular extension 31 and thence into the hollow head 1.

A conventional solenoid operated rotary clutch 35 mounts a shaft 36 and a shaft 37. The clutch is supported on the clutch bracket 34. The shafts 36 and 37 extend generally normal to the clutch bracket 34 and are substantially co-axial.

The clutch provides that when it is operative or energized the two shafts will rotate in unison and when it is inoperative the shafts can rotate independently of each other. The solenoid for the clutch is energized through conventional switch means.

Connected to the shaft 36 is a drive lever 40 which is pinned to the shaft so as to be rotatable therewith. On one end of the lever 40 is a weight 41. On the opposite end of the lever 40 is a bracket 42 on which is a semicircular boss 43. The boss 43 is in contact with a push rod 44 connected to the piston 6. The weight 42 normally biases the lever so that the boss 43 is in tight engagement with the push rod 44. The flat surface on the end of the push rod 44 in contact with the semicircular boss 43 provides that the lever 41 can rotate in direct relationship to the up and down motion of the piston 6.

The shaft 37 mounts a driven lever 45 which is pinned to the shaft so as to be rotatable therewith. One end of the lever mounts a motion pin 46. The motion pin 46 extends through a cut out section 48 on the clutch bracket 34. The bottom 49 of the cut out forms a stop to be engaged by the pin 46 inasmuch as the weight of the lever and pin will normally bias the same downwardly. The top 50 forms a stop for the up motion of the lever.

The motion pin 46 is connected to the clamp 52 which in turn is connected to the motion rod 33 of the dial indicator.

The manner in which the foregoing described structure operates is described following.

First of all, assume that the chamber 11 is connected to exhaust so that the indenter 4 is moved upwardly and a specimen is mounted on the platen in readiness for a test. The clutch 35 is de-energized so that the drive lever 40 is biased upwardly against the pushrod 44 and the driven lever 45 is down against the stop 49. The scale on the dial indicator then can be adjusted so that the pointer is at the zero line. Assume that the regulators I and B have been adjusted for a Brinell load of 3000 kg. and an initial load of 300 kg. The load selector 15 is on the I position and the valve 20 is turned to the load position so that air is supplied to the chamber 11. The indenter then moves down so that the Brinell ball firmly engages the surface of the specimen S. As the piston and the indenter moves downwardly, the piston rod also moves down and swings the drive lever 40 counterclockwise (as viewed in FIG. 1). This motion of the drive lever is permitted by virtue of the clutch being de-energized. It will be noted, therefore, that no motion is transmitted by the clutch to the driven lever 45, hence the dial indicator remains in the zero position.

After a momentary dwell in the initial load condition, the clutch 35 is energized so that the levers 40 and 45 are locked together and any further motion of the drive lever 40 is transmitted by the clutch to the driven lever 45.

After the clutch is energized, the load selector valve 15 is turned to the B position to supply air to the chamber 11 so that the full Brinell load causes the indenter to move downwardly and cause the Brinell ball indent to the specimen.

The push rod 44 being secured to the piston 6 partakes of the penetration movement and hence causes rotation of the drive lever 46 and the clutch 35 causes a corresponding motion of the driven lever 45. The motion pin 46 and clamp 52 then move the control element or motion rod 33 of the dial indicator upwardly causing rotation of the pointer on the dial. The position of the indication pointer gives the depth of penetration. This indication includes machine deflection, but this can be removed as will appear later.

When the test is over, the valve 20 is turned to the unload position and the clutch deenergized so that all the parts return to the initial positions as originally described. A new specimen can be put on the work-table and the test repeated.

As will be apparent to those skilled in the art, the dial indicator can be provided with additional pointers to be fixed in high and low positions indicating the allowable tolerance in hardness. Such an arrangement contemplates that if the pointer comes within the set range, the part is satisfactory and if below or beyond, the range is unsatisfactory. This arrangement, of course, provides for easy go—no go testing.

From the foregoing description, it will be apparent that during the period of initial load application, the portions of the equipment directly connected with the dial indicator are substantially isolated from the specimen and the indenter and therefore will unlikely receive shocks or stresses due to the contact of the indenter with the specimen.

One partciular advantage of the invention is that the same provides for a true indication of the depth and this is of importance for testing conditions over than go—no go as described heretofore. The manner in which this is done is explained following.

As will be understood by those skilled in the art, application of the Brinell load causes the machine frame to flex so that the head 1 moves slightly away from the work-table 3. This motion, of course, will be reflected in the dial indicator reading.

Now then, after the Brinell load is applied, the clutch can be deenergized and the load selector turned to the initial load condition. The frame then will return at its initial position without disturbing the relationship between the indenter and the specimens. The dial indicator pointer will move back so the flexure portion of the indication is removed. Therefore, the reading on the indicator will, for all practical purposes, correspond to the amount of penetration.

Before closing, it is pointed out that the invention contemplates the use of a motion transducer to develop an electrical control signal in lieu of a mechanical device such as a dial indicator. For example, the motion pin 46 and clamp 52 can be arranged for driving the core of a differential transformer or the wiper arm of a linear potentiometer. This is ideal for use in automated go—no go production testing. For example, where the specimen is outside of the allowable tolerance, the signal is used to energize means for shunting the specimen into a reject line.

I claim:

1. In Brinell hardness testing machine, a frame, a Brinell indenter slidably mounted on said frame, fluid pressure means for moving the indenter, the improvement which comprises:

a pair of shafts;

a clutch connecting the shafts for rotation independently of each other when the clutch is inoperative and for rotation in unison when the clutch is operative;

means connecting said clutch to the machine frame;

a drive lever connected to one of said shafts for rotation therewith;

a push rod, one end of which is connected to the indenter and the other end of which has a flat surface;

a boss on the drive lever;

a weight on the drive lever biasing the boss against said flat surface;

a driven lever connected to the other of said shafts for rotation wherewith;

a stop on said machine frame, the weight of the driven lever normally biasing the lever against the stop when the clutch is inoperative;

a motion transducer including a movable control element; and means connected between said driven lever and said control element and causing the element to be movable with the lever.

2. In Brinell hardness testing machine, a frame, a Brinell indenter slidably mounted on said frame, fluid pressure piston and cylinder means for moving the indenter, the improvement which comprises:

a main plate connected to said frame, the plate having an aperture;

a dial indicator connected to the plate and extending across said aperture;

a clutch bracket connected to and extending normally away from said plate, the clutch bracket having a cut out section;

a pair of shafts extending generally normally to said clutch bracket;

a clutch supported by said bracket and connecting the shafts for rotation independently of each other when the clutch is inoperative and for rotation in unison when the clutch is operative;

a drive lever connected to one of said shafts for rotation therewith and extending generally parallel said clutch plate, a weight on one end of said drive lever;

a push rod on said piston making a pivotal connection with the other end of said drive lever, the weight biasing the lever against the push rod;

a driven lever connected to the other of said shafts and extending generally parallel said clutch plate;

a motion pin connected to said driven lever and extending through the said cut out section of the clutch bracket; and a clamp mounted on said motion pin and connected to the motion rod of the dial indicator.

3. In Brinell hardness testing machine, a frame, a Brinell indenter slidably mounted on said frame, fluid pressure means for moving the indenter, the improvement which comprises:

a pair of shafts;

a clutch connecting the shafts for rotation independently of each other when the clutch is inoperative and for rotation in unison when the clutch is operative;

means connecting said clutch to the machine frame;

a drive lever connected to one of said shafts for rotation therewith;

a push rod, one end of which is connected to the indenter and the other end of which has a flat surface;

a boss on the drive lever;

a weight on the driver lever biasing the boss against said flat surface;

a driven lever connected to the other of said shafts for rotation therewith;

a stop on said machine frame, the weight of the driven lever normally biasing the lever against the stop when the clutch is inoperative;

a dial indicator connected to said frame, the dial indicator including a motion rod;

a control element comprising a clamp secured to said motion rod; and means connected between said driven lever and said control element and causing the element to be movable with the lever.

References Cited

UNITED STATES PATENTS

| | | | |
|---|---|---|---|
| 2,009,316 | 7/1935 | Gogan | 73—83 |
| 2,198,259 | 4/1940 | Smith | 73—83 |
| 2,333,747 | 11/1943 | Sklar | 73—83 |
| 2,839,917 | 6/1958 | Webster | 73—81 |
| 1,516,208 | 11/1924 | Rockwell | 73—83 |
| 2,203,129 | 6/1940 | Campbell et al. | 73—83 |
| 2,580,869 | 1/1952 | Winther | 192—8 X |

RICHARD C. QUEISSER, Primary Examiner

E. J. KOCH, Assistant Examiner